(12) United States Patent
Frappin

(10) Patent No.: US 6,497,282 B2
(45) Date of Patent: Dec. 24, 2002

(54) METHOD OF MONITORING THE DIAMETER OF COLUMNS MADE BY INJECTION

(75) Inventor: Pierre Frappin, Nanterre (FR)

(73) Assignee: Compagnie du Sol, Nanterre (FR)

(*) Notice: Subject to any disclaimer, the term of this patent is extended or adjusted under 35 U.S.C. 154(b) by 22 days.

(21) Appl. No.: 09/736,732

(22) Filed: Dec. 14, 2000

(65) Prior Publication Data

US 2001/0014257 A1 Aug. 16, 2001

(30) Foreign Application Priority Data

Dec. 14, 1999 (FR) .............................. 99 15732

(51) Int. Cl.$^7$ .............................. F21B 40/07
(52) U.S. Cl. .............................. 166/253.1; 166/250.14; 405/232
(58) Field of Search ........... 405/232; 166/253.1, 166/250.14

(56) References Cited

U.S. PATENT DOCUMENTS 4,837,509 A * 6/1989 Dodmann et al. .......... 324/207

FOREIGN PATENT DOCUMENTS

| EP | 0 518 686 A1 | 12/1992 |
|---|---|---|
| FR | 2 700 128 | 7/1994 |

* cited by examiner

Primary Examiner—William Neuder
(74) Attorney, Agent, or Firm—Merchant & Gould P.C.

(57) ABSTRACT

The invention relates to a method of monitoring the diameter of columns made in the ground by jet grouting. In the method, a measuring instrument is provided which is constituted by a tubular element of length substantially equal to the length of the column, said tubular element being fitted with a plurality of emission electrodes for creating an electric field, and with a plurality of measurement electrodes for measuring the resulting potential differences; a reference borehole is made in the ground; an axial borehole is made in the column to be tested; said measuring instrument is inserted in the borehole in said column and voltage measurements are performed at different depths; and said measurements are processed.

18 Claims, 2 Drawing Sheets

METHOD OF MONITORING THE DIAMETER OF COLUMNS MADE BY INJECTION

The present invention relates to a method of monitoring the diameter of columns made by the technique of injection under pressure known as "jet grouting".

BACKGROUND OF THE INVENTION

That technique consists in drilling a substantially cylindrical vertical hole in the ground by using a tool which delivers one or more jets of liquid under pressure enabling the ground installation to be prepared, with the hole obtained in this way being filled with a grout or analogous material so as to obtain a column which is molded in the borehole. That technique is described in particular in French patent No. 2 700 128.

It will be understood that during the operation of "drilling" the hole by means of jets of liquid. Under pressure, the actual diameter of the borehole can vary significantly at successive depths, depending on the irregularities encountered in the subsoil, and in particular depending on the varying nature of the subsoil. As a result, the column obtained in this way can have significant relative differences of diameter depending on the depth under consideration. This problem is particularly severe when the depth of the column is large, which depth can be as much as 15 meters.

In some cases, a succession of adjacent columns are made so as to constitute a continuous barrier in the ground. It is clear that for that type of application, it is particularly important to be able to monitor the diameter of each column at different depths so as to be sure that the resulting barrier is continuous over its entire height.

At present there is no method of monitoring the diameter of columns made by jet grouting once they have been made. The technique used consists in making a test column whose top portion is unearthed so as to inspect its diameter visually. It will nevertheless be understood that that technique is relatively burdensome to use and in any event does not enable the diameter of the deeper portions of the column to be monitored.

Techniques are also known for making electrical measurements in order to determine the nature of the ground to a certain depth. In those techniques, a probe comprising a succession of regularly spaced apart electrodes is installed in a borehole, and the electrodes serve both as electrodes for measuring potential difference and as electrodes for injecting electricity into the ground.

The electrodes that inject electric current create electric field lines in a cylindrical volume surrounding the borehole, and the potential difference measurements performed at different depths in the borehole enable the characteristics of the ground to be determined at different depths by measuring a physical magnitude representative of the nature of the ground. This physical magnitude is constituted by the resistivity of the ground which, when determined, can be used to evaluate the nature of the ground. One such technique is described in detail in European patent No. 0 518 686, in the name of the Applicant.

OBJECTS AND SUMMARY OF THE INVENTION

An object of the present invention is to provide a method of monitoring the diameter of columns made in the ground by jet grouting, which method is not of the destructive type, and enables monitoring to be performed over the full height of the column made.

To achieve this object, the invention provides a method of monitoring the diameter of columns made in the ground by jet grouting, the method comprising the following steps:

a measuring instrument is provided that is constituted by a tubular element of length substantially equal to that of the column, said tubular element being fitted with a plurality of emission electrodes for creating an electric field and with a plurality of measurement electrodes for measuring potential differences created by said electric field, the electrodes being connected respectively to a source of electricity and to potential measuring means;

a reference borehole is made in the ground close to the location where the columns are made, and said measuring instrument is placed therein to take voltage measurements representative of the physical characteristics of the ground at different depths of the reference borehole so as to obtain a series of reference measurements for said depths;

an axial borehole is bored in the column to be tested, with the diameter of the axial borehole being much smaller than the diameter of said column;

said measuring instrument is inserted into the borehole made in said column and voltage measurements are made corresponding to different depths, thus obtaining actual measurements of voltages representative of a physical characteristic associated with said column and with the surrounding ground at different depths; and said actual measurements are processed with reference to said reference measurements so as to obtain information representative of the diameter of said column at said different depths.

It will be understood that in this method, a reference borehole is made initially close to the location where the columns are to be made. Electrical measurements are taken in the reference borehole to obtain the reference physical magnitudes corresponding to different depths in the resulting borehole. The depth of the borehole naturally corresponds to the depth of the columns to be made.

In a second step, after the column has been made by jet grouting, an axial borehole is made in the resulting column and the same measuring apparatus is used to take measurements at different depths of the borehole, and thus of the column. The measurements taken in this way serve to obtain, for each depth, a physical parameter which is associated firstly with the diameter of the column at said depth and secondly with the surrounding portion of ground involved in the electric field that is created. By processing these measurements at each depth in association with the results obtained when performing reference measurements in the reference borehole, it is possible to deduce values which are inherent to the column on its own, and thus to deduce the diameter thereof or at least a relative magnitude representative of variations in the diameter thereof.

In a first implementation, while boring the axial borehole in said column, any inclination of said borehole relative to the vertical is measured at different depths so as to obtain a series of inclination measurements, and the information representative of column diameter for the different depths is corrected with the help of said inclination measurements.

In this improved implementation, it will be understood that account is taken of any inclination of the borehole made in the column prior to installing the measuring instrument. Determining inclination at different measurement depths enables the actual measurements to be corrected and thus enables diameter measurements to be corrected.

In a first implementation, said axial borehole is made when the material for making said column has not yet set.

In a second implementation, said axial borehole is made when the material constituting said column has set, at least partially.

Preferably, the physical magnitude is the resistivity of the ground or of the material constituting the column, and in order to process said actual measurements with the help of said reference measurements, special software is used for providing a three-dimensional interpretation of the reference resistivity measurements and of the actual resistivity measurements relating both to the shape of the column and to the surrounding ground.

BRIEF DESCRIPTION OF THE DRAWINGS

Other characteristics and advantages of the invention will appear better on reading the following description of different embodiments of the invention given as non-limiting examples. The description refers to the accompanying figures, in which.

MORE DETAILED DESCRIPTION

With reference initially to FIGS. 1A to 1D, there follows a description of the entire method of measuring the diameter of columns made by jet grouting, and doing so at different points along the height of the column.

Figure 1A:
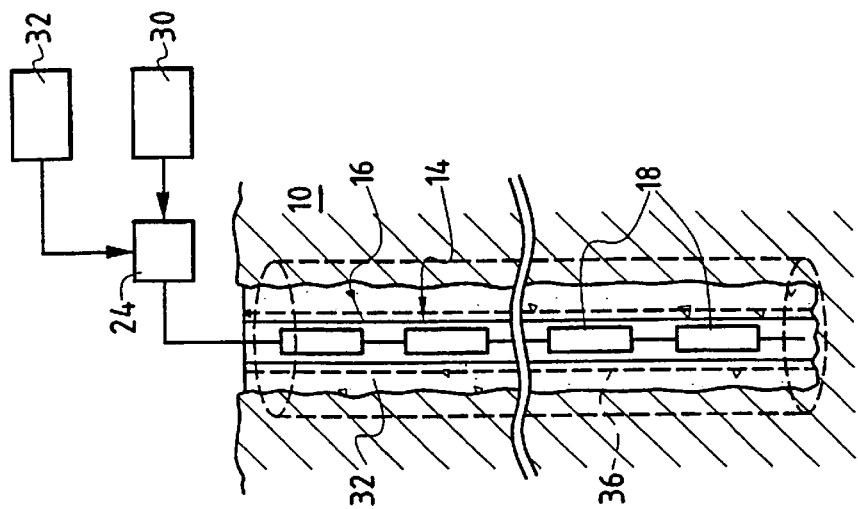
FIGS. 1A to 1D show the different steps of the method of measuring column diameter.
Figure 1B:
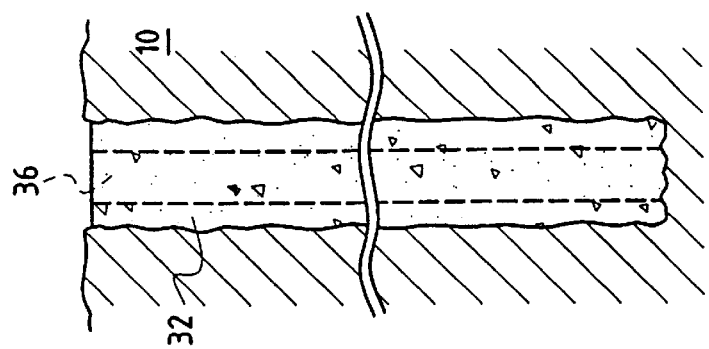

In the first step shown in FIG. 1A, a cylindrical hole 12 of length L is drilled in the ground 10, which length is equal to the length of the columns that are to be made. An electrical measurement instrument 14 is inserted into the borehole 12, which assembly comprises a tubular element 16 containing a set of probes 18 disposed at intervals and essentially constituted by electrodes each connected to electrical conductors 22. The electrical conductors 22 are connected electrical devices symbolized by reference 24 which essentially comprises current generators and devices for measuring potential differences. As described in greater detail in European patent No. 0 585 686, which should be considered as forming an integral portion of the present patent application, some of the electrodes are current injection electrodes for setting up electric field lines defining an electric cylinder 26 in the ground, which is a function of the position of the injection electrodes. The other electrodes are potential difference measuring electrodes enabling the potential difference between two distinct points in the borehole to be measured, said potential difference depending simultaneously on the created electric field and on the resistivity of the medium concerned by the created electric field. It will be understood that by powering successive pairs of injection electrodes and by performing successive potential difference measurements at different levels, it is possible to draw up a map of ground resistivity for the different depths down the borehole 12. In the particular example under consideration, three distinct layers of terrain I, II, and III are determined corresponding to resistivities $\rho 01$, $\rho 02$, and $\rho 03$; these resistivity measurements associated with the depths corresponding to the different layers are stored in a memory 30.

In the following step, the jet grouting technique is used to make a first column 32 in the ground 10, with the interface between the column and the ground 10 being given reference 34. At each depth x, it will be understood that the grout constituting the column 32 presents an associated diameter that varies depending on the nature of the ground.

Figure 1C:
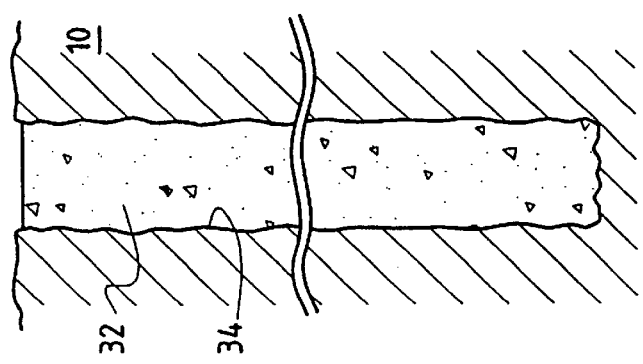

In the following step, shown in FIG. 1C, an axial borehole 36 is made in the column 32. This borehole 36 can be made either before the grout has set, in which case the borehole 36 consists in an axial zone in which the grout has reduced mechanical strength. Otherwise the borehole 36 is made after the grout has set at least to some extent, in which case the borehole 36 does indeed constitute an axial hole.

Figure 1D:
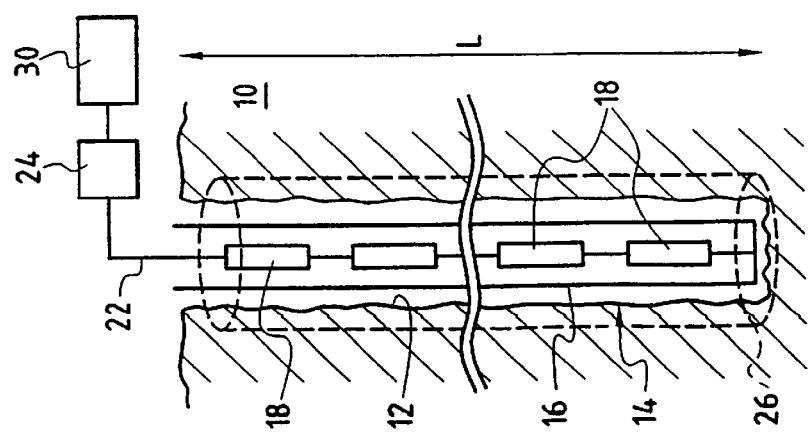

In the following step, shown in FIG. 1D, the above-described measuring instrument 14 that is essentially constituted by its tubular element and by its current injection electrodes and potential difference measuring electrodes 18 is put into place in the axial borehole 36. By powering the injection electrodes successively and performing successive measurements using the measurement electrodes, resistivity measurements are obtained for the different depths of the column where these measurements are performed. Each resistivity measurement $\rho'$ depends both on the diameter of the column, i.e. the quantity of grout involved in the potential difference measurement, and on the resistivity of the surrounding ground. It will be understood that by using the computer circuits 24 to process these different resistivity measurements $\rho x$ as a function of depth x using the reference resistivities $\rho 01$, $\rho 02$, and $\rho 03$ in this particular example, it is possible to deduce therefrom useful resistivities that correspond solely to the grout constituting the column 32, as a function of depth x. This resistivity measurement is representative of the diameter of the column at the depth in question. This processing of the resistivity measurements obtained in the reference borehole and of the resistivity measurements performed at different depths in the column is performed by implementing special software for interpreting the measured apparent resistivities. This software makes use of propagation laws for electric current in the ground (reference) and in both the ground and the column (measurements performed) in three dimensions while taking account of the parameters that relate to the ground and to the material constituting the column (layers in the ground, thicknesses of the layers, resistivities of the layers, resistivity of the column material, . . . ). In the above-mentioned patent, the principle on which this processing as applied to the ground is explained.

In an improved implementation, when the axial borehole 36 is made, any inclination of the borehole is also measured. For this purpose, the boring tool is fitted, for example, with an inclinometer. When the depth L of the column is large, it is difficult to ensure that the axial borehole 36 is accurately vertical. It will be understood that by correcting the useful resistivity values as determined above using a coefficient associated with any inclination of the borehole, it is possible to obtain the diameter of the column 32 at the different depths x with greater accuracy. The measuring instrument can be one of two different types, as shown respectively in FIGS. 2 and 3.

Figure 2:
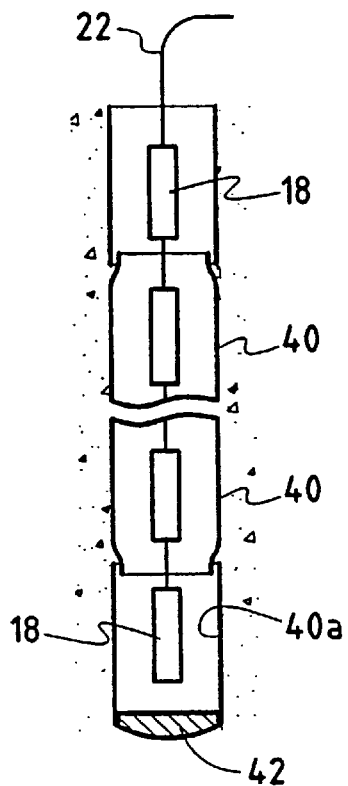
FIG. 2 shows a first implementation of the measurement method.

In FIG. 2, the tubular element of the measuring instrument is constituted by tubes of perforated plastics material 40 which are connected to one another so as to obtain a tubular element of suitable length. Probes 18 are stored in the tubular element together with their electrical conductors 22. The bottom tube 40a is closed by a plug 42. To facilitate installing the tubular element in the axial borehole and to prevent particles from penetrating into the tubular element via the perforations, it is possible to put a "sock" of engineering fabric or "geotextile" around the tubes 40. The probes can be installed inside the tubes 40 before the instrument is inserted in the axial borehole of the column.

The probes 18 can also be installed in the tubes 40 after they have been placed in the axial borehole. Naturally, an electrically conductive liquid must be introduced into the perforated tubular element so as to provide electrical continuity between the probes 18 and the material constituting the column 32.

Figure 3:
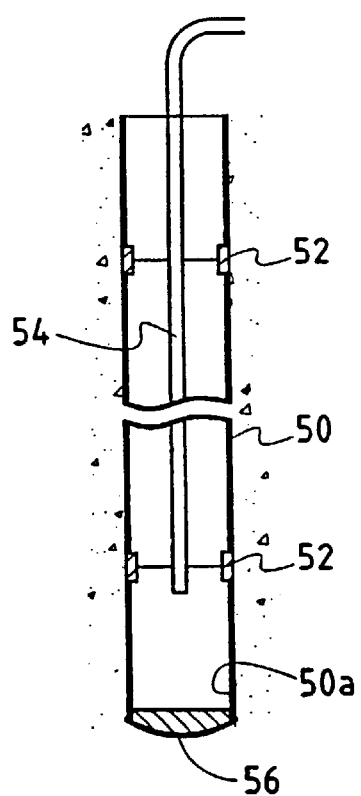
FIG. 3 shows a second implementation of the method of the invention.

In FIG. 3, the tubular element of the measuring instrument is constituted by insulating tubes 50 interconnected by conductive sleeves 52 which constitute the electrodes. A set of electrical conductors 54 connects the different conducive sleeves 52 to the electrical equipment disposed on the surface. The bottom tube 50a is fitted with a plug 56.

Such a measuring instrument is described in detail in European patent application EP 0 863 412 in the name of the Applicant.

What is claimed is:

1. A method of monitoring the diameter of columns made in the ground by jet grouting, the method comprising the following steps:

forming a column using a material that sets;

providing a measuring instrument, wherein said measuring lent comprises a tubular element having a length substantially equal to that of said column, said tubular element being fitted with a plurality of emission electrodes for creating an electric field, and with a plurality of measurement electrodes for measuring potential differences created by said electric field, wherein at least one of said emission electrodes is connected to a source of electricity and at least one of said emission electrodes is connected to a measuring means;

making a reference borehole in the ground close to the location where said at least one column is to be made;

acquiring voltage measurements by placing said measuring instrument into said reference borehole, wherein said voltage measurements are representative of the physical characteristics of the ground at different depths of said reference borehole so as to obtain a series of reference measurements for said depths;

boring an axial borehole in said column to be tested, with the diameter of the axial borehole being much smaller than the diameter of said column;

acquiring voltage measurements by inserting said measuring instrument into said borehole made in said column, wherein said voltage measurements correspond to different depths, thus obtaining actual measurements of voltages representative of a physical characteristic associated with said column and with the surrounding ground at different depths; and processing said actual measurements with reference to said reference measurements so as to obtain information representative of the diameter of said column at said different depths.

2. The method according to claim 1, further comprising the step of measuring any inclination of said borebole.

3. The method according to claim 2, wherein said inclination is measured relative to the vertical at different depths.

4. The method according to claim 2, wherein said measuring is accomplished while boring said axial borehole in said column.

5. The method according to claim 2, wherein said inclination measurements are taken in order to obtain a series of inclination measurements.

6. The method according to claim, 5 wherein said series of inclination measurements are used to correct the information representative of column diameter for the different depths.

7. The method according to claim 1, wherein said axial borehole is made when said material for making said column has not yet set.

8. The method according to claim 1, wherein said axial borehole is made when said material for making said column has set, at least partially.

9. The method according to claim 1, wherein said tubular element of said measuring instrument is constituted by a plurality of interconnected perforated tubes.

10. The method according to claim 9, wherein said emission electrodes are placed inside said tubular element.

11. The method according to claim 10, wherein said tubular element is filled with an electrically-conductive liquid.

12. The method according to claim 1, wherein said tubular element further comprises electrical conductors.

13. The method according to claim 12, wherein said tubular element of said measuring instrument comprises a plurality of assembled-together tubes made of insulating material.

14. The method of claim 13, wherein said assembled-together tubes form emission electrodes by having annular conductive zones on their outside faces.

15. The method of claim 14, wherein said electrical conductors are disposed inside said tubular element to connect said conductive annular zones to said source of electricity and to said voltage measuring means.

16. The method according to claim 1, wherein said physical characteristic is resistivity.

17. The method according to claim 16, wherein, said actual measurements are processed with the help of said reference measurements.

18. The method of claim 17, wherein said special software is used for providing a three-dimensional interpretation of the reference resistivity measurements and of the actual resistivity measurements relating both to the shape of the column and to the surrounding ground.

\* \* \* \* \*